United States Patent [19]

Bremer et al.

[11] Patent Number: 6,162,886

[45] Date of Patent: Dec. 19, 2000

[54] COPOLYMERS WHICH CONTAIN HYDROXYL GROUPS AND A METHOD OF PRODUCING THEM

[75] Inventors: Gerhard Bremer, Frechen; Hermann Kerber, Wuppertal; Manfred Krumme, Erftstadt; Olaf Ley; Werner Stephan, both of Wuppertal; Jörg Wabbels, Bochum, all of Germany

[73] Assignee: Herberts Gesellschaft mit Beschrankter Haftung, Wuppertal, Germany

[21] Appl. No.: 09/015,852

[22] Filed: Jan. 29, 1998

[30] Foreign Application Priority Data

Feb. 4, 1997 [DE] Germany ............................ 197 04 020

[51] Int. Cl.$^7$ ............................ C08F 20/26; C08F 20/10; C08F 24/00; C08F 120/00; C08F 20/00

[52] U.S. Cl. ..................... 526/318.42; 526/79; 526/266; 526/318; 526/318.45; 525/329.5; 525/329.7; 525/330.1

[58] Field of Search ..................... 525/123, 329, 525/329.5, 329.7; 526/86, 266, 79, 318, 318.45, 318.42

[56] References Cited

U.S. PATENT DOCUMENTS

| | | | |
|---|---|---|---|
| 3,694,415 | 9/1972 | Honda et al. | 522/96 |
| 4,082,816 | 4/1978 | Fisk et al. | 525/419 |
| 4,245,076 | 1/1981 | Marquardt | 526/320 |
| 4,525,499 | 6/1985 | Hayashi et al. | 523/523 |
| 5,075,370 | 12/1991 | Kubitza et al. | 524/591 |
| 5,276,104 | 1/1994 | Hoffmanne et al. | 525/329.5 |
| 5,322,897 | 6/1994 | Jung et al. | 525/123 |
| 5,422,421 | 6/1995 | Hovestadt et al. | 528/355 |
| 5,466,860 | 11/1995 | Flosbach et al. | 560/43 |
| 5,663,265 | 9/1997 | Epple et al. | 526/320 |

FOREIGN PATENT DOCUMENTS

| | | |
|---|---|---|
| 0 349 818 | 1/1990 | European Pat. Off. . |
| 0 580 054 | 1/1994 | European Pat. Off. . |
| 0 653 468 | 5/1995 | European Pat. Off. . |
| 0 680 977 | 11/1995 | European Pat. Off. . |
| 28 51 616 | 6/1980 | Germany . |
| 37 31 652 | 4/1989 | Germany . |
| 38 23 005 | 1/1990 | Germany . |
| 38 29 587 | 3/1990 | Germany . |
| 42 26 243 | 2/1994 | Germany . |

OTHER PUBLICATIONS

*Ullman's Encyclopedia of Industrial Chemisty*, Fifth Completely Revised Edition, vol. A2, pp. 115–141., 1994.

*Primary Examiner*—David W. Wu
*Assistant Examiner*—Tanya Zalukaeva
*Attorney, Agent, or Firm*—Schwegman, Lundberg, Woessner & Kluth, P.A.

[57] ABSTRACT

This invention relates to copolymers which contain hydroxyl groups and which are based on vinyl esters of monocarboxylic acids, wherein the copolymers which contain hydroxyl groups have an OH number of 110–170 mg KOH/g, an acid number of 5–35 mg KOH/g and a number average molecular weight $M_n$ of 1500–8000 g/mole and are obtainable by the polymerisation of A) 5–20% by weight of one or more vinyl esters of saturated monocarboxylic acids, B) 10–30% by weight of one or more aromatic vinyl hydrocarbons, C) 41–55% by weight of hydroxy-functional, polymerisable, unsaturated monomers, and D) 0–40% by weight of further polymerisable, unsaturated monomers, wherein component C) contains C1) 40–70% by weight of one or more hydroxyalkyl esters of α,β-unsaturated monocarboxylic acids, C2) 1–10% by weight of one or more lactones, and C3) 30–55% by weight of one or more reaction products of an α,β-unsaturated monocarboxylic acid with a glycidyl ester of a saturated α,α-dialkylalkanemonocarboxylic acid or of a saturated α-alkylalkanemonocarboxylic acid, and the sum of components A) to D) and the sum of components C1) to C3) add up to 100% by weight in each case.

12 Claims, No Drawings

COPOLYMERS WHICH CONTAIN HYDROXYL GROUPS AND A METHOD OF PRODUCING THEM

This invention relates to copolymers which contain hydroxyl groups and which are suitable as binder vehicles for solvent-based coating media. They are employed, in particular, for the production of transparent and/or pigmented covering lacquer coats for the coating of vehicles and vehicle parts.

Copolymers which contain hydroxyl groups and which can be crosslinked with polyisocyanates or melamine resins are known as lacquer binder vehicles for the coating of vehicles. The properties of coating media formulated from these binder vehicles can be modified by diverse variations of the copolymer composition, as regards the type of monomer and the amount of monomer, and can be matched to requirement profiles which differ depending on the purpose of application.

Thus DE-A-37 31 652 describes coating media based on polyacrylate resins which comprise hydroxyl, carboxyl and tertiary amino groups, wherein the copolymers are produced from hydroxy-functional olefnically unsaturated monomers, olefnically unsaturated carboxylic acids and other polymerisable monomers, and the reaction product is further reacted with compounds which contain isocyanate groups and tertiary amino groups. The hydroxy-functional olefnically unsaturated monomers may consist in part of alkyl esters of unsaturated carboxylic acids which are modified with caprolactone and/or of reaction products of unsaturated carboxylic acids such as acrylic acid with glycidyl esters of alpha,alpha-dialkylalkane-monocarboxylic acids.

DE-A-28 51 616 describes copolymer solutions which are obtained by the reaction of unsaturated monocarboxylic acids with monoglycidyl compounds, e.g. of acrylic acid with glycidyl esters of alpha,alpha-dialkylalkane-monocarboxylic acids, in an organic solvent in the presence of monomeric vinyl compounds, and are subsequently polymerised with the vinyl compounds.

A disadvantage of the copolymer resins described above is that isocyanate-crosslinking coating media which are formulated from them exhibit unsatisfactory drying properties and an inadequate hardness under the conditions pertaining to the coating of automobiles for repair purposes.

In addition, EP-A-349 818 describes copolymers which contain hydroxyl groups and which are produced by the solution polymerisation of 5–25% by weight of vinyl esters of monocarboxylic acids, 10–50% by weight of aromatic vinyl hydrocarbons and 10–40% by weight of hydroxy-functional unsaturated monomers, wherein the monomers are added in a special manner. The copolymers which are thus produced have a high content of residual monomers, comprising vinyl esters of monocarboxylic acids, which results in polymer solutions which are rendered strongly turbid. Moreover, clear lacquers produced from these copolymers have unsatisfactory drying properties at room temperature.

The object of the present invention is therefore to provide hydroxy-functional copolymers based on vinyl esters of monocarboxylic acids which have a very low residual monomer content of vinyl esters of saturated monocarboxylic acids and which result in polymer solutions which are free from turbidity. Coating media formulated with these hydroxy-functional copolymers should produce films of high brilliance, and should exhibit short drying times and a very good hardness, particularly under the conditions of coating vehicles for repair purposes.

This object is achieved by copolymers which have an OH number of 110–170 mg KOH/g, an acid number of 5–35 mg KOH/g and a number average molecular weight Mn of 1500–8000, which are obtainable by the polymerisation of
  A) 5–20% by weight of one or more vinyl esters of saturated monocarboxylic acids,
  B) 10–30% by weight of one or more aromatic vinyl hydrocarbons,
  C) 41–55% by weight of hydroxy-functional, polymerisable, unsaturated monomers, and
  D) 0–40% by weight of further polymerisable, unsaturated monomers,
    wherein component C) contains
      C1) 40–70% by weight of one or more hydroxyalkyl esters of $\alpha,\beta$-unsaturated monocarboxylic acids,
      C2) 1–10% by weight of one or more lactones, and
      C3) 30–55% by weight of one or more reaction products of an $\alpha,\beta$-unsaturated monocarboxylic acid with a glycidyl ester of a saturated $\alpha,\alpha$-dialkylalkane-monocarboxylic acid or of a saturated $\alpha$-alkylalkane-monocarboxylic acid, and the sum of components A) to D) and the sum of components C1) to C3) add up to 100% by weight in each case.

The expression "(meth)acryl" here and hereinafter denotes acrylic and/or methacrylic.

The present invention further relates to solvent-based coating media, containing
  a) binder vehicles based on the aforementioned hydroxy-functional copolymers,
  b) one or more crosslinking agents,
  c) organic solvents, and optionally
  d) pigments, extenders and/or customary lacquer additives also.

Production of the copolymers according to the invention from components A), B), C) and optionally D) can be effected by polymerisation by customary methods, e.g. by bulk, solution or pearl polymerisation. These various polymerisation methods are well known to one skilled in the art.

The solution polymerisation method is preferred for the production of the copolymers according to the invention. In this method, the solvent is initially placed in the reaction vessel and heated to its boiling temperature, and the monomer/initiator mixture is continuously added over a defined period. Polymerisation is preferably conducted at temperatures between 100° C. and 180° C., most preferably at 130° C. to 160° C. The polymerisation reaction may be initiated using known polymerisation initiators.

Examples of initiators which are preferably used for the polymerisation include: dialkyl peroxides such as di-tert.-butyl peroxide or dicumyl peroxide; diacyl peroxides such as dibenzoyl peroxide or di-lauroyl peroxide; peresters such as tert.-butyl perbenzoate or tert.-butyl perpivalate; hydroperoxides such as cumene hydroperoxide; and azo compounds such as azo-bis-cyclohexane-carbonitrile or azo-bis-isobutyronitrile.

Examples of suitable organic solvents which can advantageously be used during the solution polymerisation step and which can also be used subsequently in the coating media according to the invention include: glycol ethers such as ethylene glycol dimethyl ether or propylene glycol dimethyl ether; glycol ether esters such as ethyl glycol acetate, butyl glycol acetate, 3-methoxy-n-butyl acetate, isobutyl acetate or amyl acetate; ketones such as methyl ethyl ketone, methyl isobutyl ketone, cyclohexanone or isophorone; aromatic hydrocarbons (e.g. those with a boiling range of 136–180° C.); and aliphatic hydrocarbons.

Chain transfer agents, such as mercaptans, esters of thioglycolic acid, cumene or dimeric alpha-methylstyrene for example, can be used to regulate the molecular weight.

The copolymers which are obtained from monomer components A), B), C) and optionally D) have an OH number of 110–170, preferably of 120–160 mg KOH/g, an acid number of 5–35, preferably of 10–30 mg KOH/g, a number average molecular weight Mn of 1500–8000, preferably of 2000–6000, and a glass transition temperature $T_g$ of 30–70° C., preferably of 40–60° C.

The copolymers have a maximum residual monomer content of vinyl esters of unsaturated monocarboxylic acids (component A) of 1% by weight, preferably less than 0.9% by weight (determined by the MCS method—multi-column switching gas chromatographic system), with respect to the total amount of component A used in each case. Vinyl esters of saturated monocarboxylic acids, preferably vinyl esters of saturated monocarboxylic acids which contain 5–15 C atoms in their molecule and which are branched in the alpha position, are used, separately or in admixture, as monomer component A). Vinyl esters of saturated alpha-alkylalkane-monocarboxylic acids and/or of saturated alpha,alpha-dialkylalkane-monocarboxylic acids which contain 5–13 C atoms in their molecule are preferred in this respect. The glycidyl esters of alpha,alpha-dialkylalkane-monocarboxylic acids which contain 9–11 C atoms in their molecule are particularly preferred. The alkyl radicals here may also have a different number of C atoms. The vinyl esters are obtained, for example, by the reaction of the aforementioned saturated monocarboxylic acids with acetylene. They are commercially available, e.g. as Veova 9, Veova 10.

Component A) is used in an amount of 5–20% by weight, preferably 8–14% by weight, with respect to t h e total copolymer.

Aromatic vinyl hydrocarbons, preferably those which contain 8–9 C atoms per molecule, are used as monomer component B). Examples of suitable compounds include styrene, alpha-methylstyrene, chlorostyrenes, vinyl toluenes, 2,5-dimethylstyrene and p-methoxystyrene. Styrene is preferably used. Component B) is used in an amount of 10–30% by weight, preferably of 12–20% by weight, with respect to the total copolymer.

Monomer component C) comprises hydroxy-functional, unsaturated monomers. Component C) is used in an amount of 41–55% by weight, preferably of 43–50% by weight, with respect to the total copolymer. Hydroxy-functional component C) contains components C1) to C3).

Hydroxyalkyl esters of alpha,beta-unsaturated monocarboxylic acids with primary or secondary hydroxyl groups are used as component C1). These may be hydroxyalkyl esters of acrylic acid, methacrylic acid, crotonic acid and/or isocrotonic acid. Hydroxyalkyl esters of (meth)acrylic acid are preferred. The hydroxyalkyl radicals may contain 1–10 C atoms, for example, preferably 2–6 C atoms. Examples of suitable hydroxyalkyl esters of alpha,beta-unsaturated monocarboxylic acids with primary hydroxyl groups include hydroxyethyl (meth)acrylate, hydroxypropyl (meth)acrylate, hydroxybutyl (meth)acrylate, hydroxyethyl (meth)acrylate and hydroxyhexyl (meth)acrylate. Examples of suitable hydroxyalkyl esters comprising secondary hydroxyl groups include 2-hydroxypropyl (meth)acrylate, 2-hydroxybutyl (meth)acrylate and 3-hydroxybutyl (meth)acrylate.

Component C1) is used in an amount of 40–70% by weight, preferably 50–60% by weight, with respect to the total amount of component C).

One or more lactones are used as component C2). Examples of suitable lactones are those which contain 3–15 C atoms in their ring, wherein their rings may also comprise different substituents. The preferred lactones are gamma-butyrolactone, delta-valerolactone, epsilon-caprolactone, beta-hydroxy-beta-methyl-delta-valerolactone, lambda-laurolactone or mixtures thereof. Epsilon-caprolactone is particularly preferred.

Modification of the hydroxyl groups of part of the hydroxyalkyl esters of alpha,beta-unsaturated monocarboxylic acids (component C1) described above is effected by means of the lactones used, by an esterification reaction which proceeds with ring opening of the lactone. During this reaction, new terminal hydroxyl groups are produced, in the form of hydroxyalkyl ester groups which correspond to the respective lactone. The reaction products are preferably one mole of a hydroxyalkyl ester of an alpha,beta-unsaturated monocarboxylic acid and 1–5 moles, preferably 2 moles on average, of a lactone. Modification of the hydroxyl groups of the hydroxyalkyl ester by the lactone can be effected before, during or following the copolymerisation reaction.

Component C2) is used in an amount of 1–10% by weight, preferably 1–6% by weight, with respect to the total amount of component C).

The reaction products of alpha,beta-unsaturated monocarboxylic acids with glycidyl esters of saturated alpha-alkylalkane-monocarboxylic acids or of saturated alpha,alpha-dialkylalkane-monocarboxylic acids are used as component C3). These are preferably the reaction products of (meth)acrylic acid with glycidyl esters of saturated alpha,alpha-diakylalkane-monocarboxylic acids which contain 7–13 C atoms in their molecule, most preferably those which contain 9–11 C atoms in their molecule. The glycidyl esters are produced in the known manner, for example by the reaction of the corresponding carboxylic acids with epichlorohydrin. They are commercially available, e.g. as Cardura E10.

Reaction product C3) can be produced before the copolymerisation reaction or in the presence of the other unsaturated, polymerisable monomers.

Component C3) is used in an amount of 30–55% by weight, preferably 35–50% by weight, with respect to the total amount of component C).

Monomer component D) can be used for the production of the copolymers according to the invention. Other unsaturated, polymerisable monomers, which are different from A), B) and C), can be used as component D). These may be unsaturated monomers which comprise other functional groups, e.g. amino groups, ether groups and carboxyl groups, and/or unsaturated monomers without other functional groups.

Examples of unsaturated monomers comprising carboxyl groups include alpha-beta-unsaturated monocarboxylic acids such as acrylic acid, methacrylic acid, crotonic acid and isocrotonic acid. Acrylic and methacrylic acids are preferred.

Examples of suitable unsaturated monomers without other functional groups include esters of unsaturated monocarboxylic acids with aliphatic, monohydric, branched, unbranched or cyclic alcohols which comprise 1–20 C atoms. Esters of acrylic acid or of methacrylic acid are preferred. Examples of esters with aliphatic alcohols include methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of esters with cyclic alcohols include cyclohexyl acrylate, trimethylcyclohexyl acrylate, 4-tert.-butylcyclohexyl acrylate, isobutyl acrylate and the corresponding methacrylates. Esters which are different from A) can also be used, such as vinyl acetate or vinyl propionate for example.

Ethylenically polyunsaturated monomers can also be used. These are monomers which contain at least 2 double bonds which can be polymerised by a radical mechanism.

Examples thereof include divinylbenzene, 1,4-butanediol diacrylate, 1,6-hexanediol diacrylate, neopentyl glycol dimethacrylate and glycerol dimethacrylate.

Component D) is preferably used in an amount of 20–35% by weight with respect to the total copolymer.

Solvent-based coating media can be produced from the hydroxy-functional copolymers according to the invention. These coating media contain one or more crosslinking agents. Polyisocyanates, blocked polyisocyanates and/or amino plastic resins can be used as crosslinking component b).

Examples of suitable polyisocyanates include any organic polyisocyanates which comprise aliphatically, cycloaliphatically, araliphatically and/or aromatically bonded free isocyanate groups. These polyisocyanates are liquid at room temperature, or can be liquefied by the addition of organic solvents. In general, the polyisocyanates have a viscosity at 23° C. of 1 to 6000 mPas, preferably greater than 5 and less than 3000 mPas.

Polyisocyanates of this type are generally known and are, for example, described in DE-A-38 29 587 or DE-A 42 26 243.

These polyisocyanates are preferably polyisocyanates or polyisocyanate mixtures which exclusively contain aliphatically and/or cycloaliphatically bonded isocyanate groups and which have an average NCO functionality of 1.5 to 5, preferably 2 to 4.

Examples of polyisocyanates which are particularly suitable are the so-called "lacquer polyisocyanates" based on hexamethylene diisocyanate, 1-isocyanato-3,3,5-trimethyl-5-isocyanatomethyl-cyclohexane (IPDI) and/or bis (isocyanatocyclohexyl)-methane, and the derivatives of these diisocyanates which comprise biuret, allophanate, urethane and/or isocyanurate groups and which are known in the art, which following their production have been freed from excess diisocyanate starting material, preferably by distillation, apart from a residual content of less than 0.5% by weight.

Polyisocyanates which are also very suitable are sterically hindered polyisocyanates of general formula

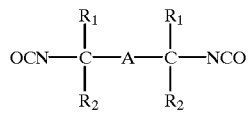

wherein

R$_1$=H or R$_2$,

R$_2$=C$_n$H$_{2n+1}$ where n=1 to 6.

The substituents R$_1$ and R$_2$ are either linear or branched, and are either the same or different. The skeletal structure A may consist of a single bond, of an aromatic or alicyclic ring, or of an aliphatic linear or branched C chain comprising 1 to 12 C atoms. Examples thereof include 1,1,6,6-tetramethyl-hexamethylene dilsocyanate, 1,5-dibutyl-pentamethyl diisocyanate, or p- or m-tetramethylxylylene diisocyanate.

The dilsocyanates can also be reacted in the customary manner to form compounds of higher functionality, for example by trimerisation or by reaction with water or polyols, such as trimethylolpropane or glycerol.

The polyisocyanates can also be used in the form of isocyanate-modified resins.

The polyisocyanates can also be used in blocked or partially blocked form. Examples of blocked or partially blocked isocyanates include any di- and/or polyisocyanates in which the isocyanate groups or part of the isocyanate groups have been reacted with compounds which contain active hydrogen. Corresponding prepolymers which contain isocyanate groups can also be used as di- and/or polyisocyanates. Examples thereof include aliphatic, cycloaliphatic or aromatic polyisocyanates, which are optionally sterically hindered also, such as those which have already been described above. Trivalent aromatic and/or aliphatic, blocked or partially blocked isocyanates, with a number average molecular weight of 500–1500 for example, are preferred.

Low molecular weight compounds which contain acidic hydrogen are known for the blocking of NCO groups. Examples thereof include aliphatic or cycloaliphatic alcohols, dialkylamino alcohols, oximes, lactams, imides, hydroxyalkyl esters, and esters of malonic acid or of acetoacetic acid.

Amino plastic resins are also suitable as crosslinking agents. Amino plastic resins are described, for example, in Ullmann's Encyclopedia of Industrial Chemistry, 5th Edition, Vol. A2, in the "Aminoresins" chapter on pages 115–141 (1985), and in Houben-Weyl: "Methoden der Organischen Chemie", Volume 14/2, pages 319–399 (1962). These resins are produced according to the prior art and are offered for sale as commercial products by many companies. Examples of amino plastic resins such as these include amine-formaldehyde condensation resins which are produced by the reaction of aldehydes with melamine, guanamine, benzoguanamine or dicyandiamide. The alcohol groups of the aldehyde condensation products are then partially or completely etherified with alcohols.

The coating media according to the invention contain organic solvents. The solvents may originate from the production of the binder vehicles or may be added separately. Examples thereof include the solvents which have already been cited above for the production of solution polymers.

The coating media according to the invention may contain pigments and/or extenders. All customary lacquer pigments of an organic or inorganic nature are suitable as pigments. Examples of inorganic or organic colouring pigments and extenders include titanium dioxide, micronised titanium dioxide, iron oxide pigments, zinc phosphate (an anti-corrosion pigment), azo pigments, phthalocyanine pigments, quinacridone or pyrrolopyrrole pigments, carbon black, silica, barium sulphate, french chalk, aluminium silicate and magnesium silicate.

The coating media may contain customary lacquer additives. These additives are the customary additives which can be used in the lacquer sector. Examples of additives such as these include light stabilisers, e.g. those based on benztriazoles and HALS compounds, spreading agents based on (meth)acrylic homopolymers or silicone oils, rheology-influencing agents such as microdispersed hydrated silica or polymeric urea compounds, thickeners such as crosslinked polycarboxylic acids or polyurethanes, anti-foaming agents, wetting agents, curing accelerators for the crosslinking reaction of the OH-functional binder vehicles, for example dibutyltin laurate or zinc naphthenate, and compounds such as triethylamine which contain tertiary amino groups for the crosslinking reaction with polyisocyanates. These additives are used in the customary amounts which are familiar to one skilled in the art.

For the production of pigmented coating media, the individual constituents are mixed with one another and are homogenised or comminuted in the usual manner. A procedure can be employed, for example, in which part of the copolymer which contains hydroxyl groups is first mixed with the pigments and/or extenders and with customary lacquer additives and solvents and is ground in grinding units. Thereafter, the ground material is completed by adding the remaining copolymer solution.

Single-component or two-component coating media can be formulated using the binder vehicles according to the invention, depending on the type of crosslinking agent. If polyisocyanates which contain free isocyanate groups are used as crosslinking agents, the coating media are two-component systems, i.e. the binder vehicle component which contains hydroxyl groups is first mixed with the polyisocyanate component, optionally together with pigments, extenders and customary lacquer additives, shortly before application. The coating medium can then be adjusted to the spraying viscosity if necessary, using organic solvents. The coating media which are produced in this manner are particularly suitable for the production of pigmented or transparent covering coats of an air-drying multi-layer coating or of one which is force-dried, e.g. up to 80° C. However, they can also be hardened at higher temperatures, e.g. of 80–140° C. They are suitable for the coating of vehicles and for industrial coating operations, and are particularly suitable for the coating of vehicles and vehicle parts for repair purposes.

The coating media are applied by known methods, e.g. by spraying, dipping, rolling or by doctor blade. When used as a transparent clear lacquer coat, the coating media can be applied to conventional or aqueous base lacquers, by the wet-into-wet method for example, whereupon both coats are hardened jointly, e.g. for 10–60 minutes at 40–80° C. When used as a pigmented covering lacquer coat, the coating media can be applied to customary one-component or two-component primer surfacer coats, for example. However, the coating media according to the invention can also be applied as a primer surfacer coat to customary primers, e.g. two-component epoxide primers, and can be dried at room temperature.

Therefore, the present invention also relates to a method of producing multi-layer coatings and to the use of the binder vehicles according to the invention in coating media for the production of multi-layer coatings, wherein in particular the pigmented covering lacquer coats and transparent clear lacquer coats of multi-layer coating are replaced by the binder vehicles or coating media according to the invention. Coating media which are formulated from the binder vehicles according to the invention exhibit a high reactivity and short drying times. Brilliant, haze-free coatings with very good hardness are obtained.

The invention is explained in more detail in the following examples.

EXAMPLE 1

Production of a (meth)acrylic copolymer 60 g of a mixture of xylene isomers, 100 g of an aromatic hydrocarbon with a boiling range of 155–178° C., 80 g n-butyl acetate, 72 g glycidyl neodecanoate with a glycidyl equivalent weight of 249, and 62 g vinyl neodecanoate were placed in a 2 liter three-necked flask fitted with a stirrer, thermometer, condenser and two dropping funnels, and the batch was heated to 149° C. with stirring. A mixture of monomers comprising 31 g acrylic acid, 80 g styrene, 135 g 2-hydroxyethyl methacrylate, 149 g methyl methacrylate and 11 g epsilon-caprolactone was added drop-wise over 5 hours, simultaneously with an initiator solution comprising 10 g of an aromatic hydrocarbon with a boiling range of 155–178° C., 5 g di-tert.-butyl peroxide and 5 g dicumyl peroxide. After the addition was complete, the temperature fell to 144° C. The dropping funnels were subsequently rinsed out with 30 g of an aromatic hydrocarbon with a boiling range of 155–178° C. Thereafter, the batch was polymerised for 4 hours. The conversion was then about 99%.

After diluting with 170 g n-butyl acetate, a (meth)acrylic copolymer solution was obtained which had a solids content of 55.4% (solids content as determined at 150° C. for 1 hour), an acid number of 17.8 mg KOH/g, an OH number of 135 mg KOH/g, a viscosity of 1800 mPa.s/25° C., and a residual monomer content of vinyl neodecanoate of 0.65% (with respect to the total amount of vinyl monomer used).

EXAMPLE 2

Production of a (meth)acrylic copolymer 60 g of a mixture of xylene isomers, 100 g of an aromatic hydrocarbon with a boiling range of 155–178° C., 80 g n-butyl acetate, 72 g glycidyl neodecanoate with a glycidyl equivalent weight of 249, and 62 g vinyl neodecanoate were placed in a 2 litre three-necked flask fitted with a stirrer, thermometer, condenser and two dropping funnels, and the batch was heated to 150° C. with stirring. A mixture of monomers comprising 31 g acrylic acid, 100 g styrene, 118 g 2-hydroxyethyl methacrylate, 14 g 2-hydroxypropyl methacrylate, 140 g methyl methacrylate and 3 g epsilon-caprolactone was added drop-wise over 5 hours, simultaneously with an initiator solution comprising 10 g of an aromatic hydrocarbon with a boiling range of 155–178° C., 5 g di-tert.-butyl peroxide and 5 g dicumyl peroxide. After the addition was complete, the temperature fell to 145° C. The dropping funnels were subsequently rinsed out with 30 g of an aromatic hydrocarbon with a boiling range of 155–178° C.

Thereafter, the batch was polymerised for 4 hours. The conversion was then about 99%.

After diluting with 170 g n-butyl acetate, a (meth)acrylic copolymer solution was obtained which had a solids content of 54.6% (solids content as determined at 150° C. for 1 hour), an acid number of 16.5 mg KOH/g, an OH number of 132 mg KOH/g, a viscosity of 1580 mPa.s/25° C., and a residual monomer content of vinyl neodecanoate of 0.8% (with respect to the total amount of vinyl monomer used).

EXAMPLE 3

Production of a (meth)acrylic copolymer 140 g of a mixture of xylene isomers, 100 g of an aromatic hydrocarbon with a boiling range of 155–178° C., 72 g glycidyl neodecanoate with a glycidyl equivalent weight of 249, and 62 g vinyl neodecanoate were placed in a 2 litre three-necked flask fitted with a stirrer, thermometer, condenser and two dropping funnels, and the batch was heated to 150° C. with stirring. A mixture of monomers comprising 31 g acrylic acid, 100 g styrene, 118 g 2-hydroxyethyl methacrylate, 14 g 2-hydroxypropyl methacrylate, 136 g methyl methacrylate and 3 g epsilon-caprolactone was added drop-wise over 5 hours, simultaneously with an initiator solution comprising 10 g of an aromatic hydrocarbon with a boiling range of 155–178° C., 7 g di-tert-butyl peroxide and 7 g dicumyl peroxide. After the addition was complete, the temperature fell to 146° C. The dropping funnels were subsequently rinsed out with 30 g of an aromatic hydrocarbon with a boiling range of 155–178° C. Thereafter, the batch was polymerised for 4 hours. The conversion was then about 99%.

After diluting with 170 g of a mixture of xylene isomers, a (meth)acrylic copolymer solution was obtained which had a solids content of 54.3% (solids content as determined at 150° C. for 1 hour), an acid number of 16.1 mg KOH/g, an OH number of 132 mg KOH/g, a viscosity of 2990 mPa.s/ 25° C., and a residual monomer content of vinyl neodecanoate of 0.82% (with respect to the total amount of vinyl monomer used).

EXAMPLE 4

Production of a clear lacquer 85.3 g of the (meth)acrylic copolymer obtained as in example 1 were mixed with 0.3 g of a solution of a silicone-containing spreading agent in a mixture of xylene isomers, 8.1 g butyl glycolate, 5.06 g of an aromatic hydrocarbon with a boiling range of 155–178° C., 0.6 g of a light stabiliser of the benztriazole type, 0.6 g of a light stabiliser of the HALS type, and 0.04 g of a 10% solution of dibutyltin dilaurate in n-butyl acetate.

EXAMPLE 5

Production of a clear lacquer 85.3 g of the (meth)acrylic copolymer obtained as in example 2 were mixed with 0.3 g of a 1% solution of a silicone-containing spreading agent in a mixture of xylene isomers, 8.1 g butyl glycolate, 5.06 g of an aromatic hydrocarbon with a boiling range of 155–178° C., 0.6 g of a light stabiliser of the benztriazole type, 0.6 g of a light stabiliser of the HALS type, and 0.04 g of a 10% solution of dibutyltin dilaurate in n-butyl acetate.

EXAMPLE 6

Production of a clear lacquer 85.3 g of the (meth)acrylic copolymer obtained as in example 3 were mixed with 0.3 g of a 1% solution of a silicone-containing spreading agent in a mixture of xylene isomers, 8.1 g butyl glycolate, 5.06 g of an aromatic hydrocarbon with a boiling range of 155–178° C., 0.6 g of a light stabiliser of the benztriazole type, 0.6 g of a light stabiliser of the HALS type, and 0.04 g of a 10% solution of dibutyltin dilaurate in n-butyl acetate.

Comparison clear lacquer

Two comparison lacquers were produced, analogously to Examples 4–6, wherein the copolymers according to the invention were replaced by comparison copolymers from EP 349 818, Example 1 and Example 2. The copolymer from Example 2 of EP 349 818 was produced without adding monoisocyanate in addition, however.

Preparation of a hardener solution

A hardener solution was prepared from 39.10 g of an aliphatic polyisocyanate based on cyclo-trimerised hexamethylene diisocyanate, 4.10 g ethoxypropyl acetate, 10.94 g n-butyl acetate, 29.20 g of an aromatic hydrocarbon with a boiling range of 155–178° C., 12.50 g of a mixture of xylene isomers, 4.00 g methoxypropyl acetate and 0.16 g of a 10% solution of dibutyltin dilaurate in n-butyl acetate.

Application of the coating media

The clear lacquers of examples 4–6 and the comparison clear lacquers, which were prepared as above, were each mixed, shortly before processing, with the hardener solution in a volume ratio of 2:1, and were adjusted to a spraying viscosity of 20 sec AK4/20° C. by dilution with 1:1 n-butyl acetate:methoxypropyl acetate.

The clear lacquers which were thus obtained were applied, by spray application using the wet-into-wet method, to a solvent-based base lacquer coat to give a dry coat thickness of 40–60 µm, and after an aeration phase of 5 minutes they were hardened for 30 minutes at 60° C. The results of lacquer technology investigations are presented in the following Table.

| Technological testing | Clear lacquers | | | Comparison clear lacquers | |
|---|---|---|---|---|---|
| | Example 4 | Example 5 | Example 6 | 1 | 2 |
| Dust-drying (DIN 53150) (min): | 25 | 20 | 30 | 35 | 45 |
| Air-drying (16 hours at 20° C.): | | | | | |
| Freedom from tack | ++ | ++ | ++ | ++ | ++ |
| Brilliance | + | + | + | (−) | + |
| Adhesive tape tests | | | | | |
| Masked sample (5 min) | + | + | + | (−) | + |
| Disappearance of the mark (min) | 5 | 5 | 10 | 25 | 10 |
| Resistance to super-grade petrol | ++ | ++ | ++ | − | + |
| Pot life (hours) | 4 | 3.5 | 3.5 | 2 | 3 |
| Oven drying (30 min at 60° C): | | | | | |
| Freedom from tack (whilst still warm) | + | ++ | + | − | (−) |
| Hardness | + | + | + | − | (−) |

-continued

| Technological testing | Clear lacquers | | | Comparison clear lacquers | |
|---|---|---|---|---|---|
| | Example 4 | Example 5 | Example 6 | 1 | 2 |
| Adhesive tape tests | | | | | |
| Masked sample (5 min) | ++ | + | + | (−) | + |
| Disappearance of the mark (min) | 5 | 5 | 10 | 60 | 15 |
| Brilliance | + | ++ | ++ | + | (−) |
| Resistance to super-grade petrol | ++ | ++ | ++ | − | + |

Explanations:
++ = very good
+ = good
(−) = satisfactory
− = poor
Comparison clear lacquer 1: comprising a copolymer corresponding to EP-A-349 818, Example 1
Comparison clear lacquer 2: comprising a copolymer corresponding to EP-A-349 818, Example 2, but without the addition of monoisocyanate

What is claimed is:

1. A coating medium, comprising (a) one or more hydroxy copolymers as a binder vehicle, (b) one or more crosslinking agents that are reactive with hydroxyl groups, and (c) an organic solvent wherein:

the hydroxy copolymer has an OH number of 110–170 mg KOH/g, an acid number of 5–35 mgKOH/g and a number average molecular weight of 1500–8000, and is a polymerization product of components A, B, C and D, wherein:

A is 5–20% by weight of one or more vinyl esters of saturated monocarboxylic acids, B is 10–30% by weight of one or more aromatic vinyl hydrocarbons, C is 41–55% by weight of hydroxy-functional, polymerizable, unsaturated monomers, and D is 0–40% by weight of further polymerizable, unsaturated monomers, wherein component C includes components C1, C2 and C3 wherein C1 is 40–70% by weight of one or more hydroxyalkyl esters of α,β-unsaturated monocarboxylic acids, C2 is 1–10% by weight of one or more lactones, and C3 is 30–55% by weight of one or more reaction products of an α,β-unsaturated monocarboxylic acid with a glycidyl ester of a saturated α,α-dialkylalkane-monocarboxylic acid or of a saturated α-alkylalkane monocarboxylic acid;

the % weights of C1, C2 and C3 being relative to the total weight of C and their sum being 100%; and, the % weights of components A–D being relative to the total weight of the hydroxyl polymer, and their sum being 100%.

2. A coating medium according to claim 1 wherein the crosslinking agent is a polyisocyanate, a blocked polyisocyanate or an amino plastic resin or any mixture thereof.

3. A coating medium according to claim 1 wherein the hydroxy copolymer is produced by the solution polymerization method.

4. A coating medium according to claim 1 wherein the hydroxy copolymer has an OH number of 120–160 mg KOH/, an acid number of 10–30 mgKOH/, and a number average molecular weight of 2000–6000 g/mole.

5. A coating medium according to claim 1 wherein the hydroxyl copolymer has a glass transition temperature between 30 and 70° C.

6. A coating medium according to claim 1 wherein the maximum proportion of residual monomer from component A is 1% by weight.

7. A coating medium according to claim 1 wherein component A is branched in the α position and contains 5–15 C atoms per molecule.

8. A coating medium according to claim 1 wherein component B is an aromatic vinyl hydrocarbon containing 8–9 C atoms per molecule.

9. A coating medium according to claim 1 wherein component C is hydroxyalkyl ester of acrylic acid, methacrylic acid, crotonic acid and/or isocrotonic acid.

10. A coating medium according to claim 1 wherein component C2 is γ-butyrolactone, δ-valerolactone, ε-caprolactone, β-hydroxy-β-methyl-δ-valerolactone, λ-laurolactone or any mixture thereof.

11. A coating medium according to claim 1 wherein component C3 is a reaction product of (meth)acrylic acid with a glycidyl ester of a saturated α,α-dialkylalkane-monocarboxylic acid containing 7 to 13 C atoms.

12. A coating medium according to claim 1 wherein component D is acrylic acid, methacrylic acid or an ester thereof or any mixture thereof.

* * * * *